United States Patent [19]
Johannsen et al.

[11] Patent Number: 5,774,529
[45] Date of Patent: Jun. 30, 1998

[54] APPARATUS TO PROVIDE A REMOTE DISPLAY OF THE OPERATING CONDITION OF A WATER TREATMENT SYSTEM

[76] Inventors: James Johannsen, 3704 Moorland Rd., Minnetonka, Minn. 55345; Jeffrey A. Zimmerman, 3851 Main St. NE., Blaine, Minn. 55434

[21] Appl. No.: 634,315

[22] Filed: Apr. 18, 1996

Related U.S. Application Data

[63] Continuation of Ser. No. 314,578, Sep. 28, 1994, abandoned.

[51] Int. Cl.⁶ .................................................. H04M 11/00
[52] U.S. Cl. ................................ 379/106.03; 379/106.01; 379/93.37; 379/93.28; 340/870.02
[58] Field of Search ............................... 379/99, 106.03, 379/106.01, 444, 282, 283, 386, 90.01, 92.01, 93.01, 93.17, 93.26, 93.28, 93.37; 340/870.01, 870.02, 870.03

[56] References Cited

U.S. PATENT DOCUMENTS

| | | | |
|---|---|---|---|
| 3,700,814 | 10/1972 | Spraker | 379/99 |
| 4,147,893 | 4/1979 | Matson | 379/106 |
| 4,201,887 | 5/1980 | Burns | 379/99 |
| 4,289,931 | 9/1981 | Baker | 379/96 |
| 4,830,757 | 5/1989 | Lynch et al. | 379/106 |

OTHER PUBLICATIONS

The article "GE Meter and Control" by General Electric Company, pp. 1–15, Dec. 27, 1991.

*Primary Examiner*—Curtis Kuntz
*Assistant Examiner*—Stephen W. Palan
*Attorney, Agent, or Firm*—Rudnick & Wolfe

[57] ABSTRACT

An apparatus for providing a remote display of the operating condition of a water treatment system having an electronic control utilizing a voice grade telephone system. A tone generator is associated with electronic control to generate tones which are transmitted through the telephone system to a decoder which provides digital signals to a microcomputer which provides a display of the operating conditions of the water treatment system at a remote location.

13 Claims, 6 Drawing Sheets

Fig. 5a

| SOFTENER CONFIGURATION | MR. HOMEOWNER ANYTOWN, USA THU MAR 04 19:03:18 1993 |
|---|---|

PWA TYPE: 7130606 REV A

SERIAL CODE: 0003 WK47 1992

MODEL: R30

VERSION: F5.4

VALVE TYPE: TWO SWITCH

TURBINE RPG: 152

Fig. 5b

| DISPLAYS | MR. HOMEOWNER ANYTOWN, USA THU MAR 04 19:03:18 1993 |
|---|---|

PRIMARY DISPLAYS

PRESENT TIME: 7:02:16 PM     HARDNESS: 14 GRAINS
RECHARGE TIME: 2:00 AM     AVG DAILY GALLONS: 179
FILTER_GALLONS: 0

SECONDARY DISPLAYS

GALLON COUNT: 15536     OPERATING CAP: 18100
12/24 FORMAT: 12     GALLONS/LITER: GALLONS
TURBINE (RPG): 152     MODE: 24
UNIT #: 1     MAX DAYS BETWEEN REGENS: AUTO
REGEN AT 97%: OFF     FILL TIME: 00:02:14
BRINE MINUTES: 41     BACKWASH MINUTES: 5
2ND BACKWASH: OFF     FAST RINSE TIME: 3

Fig. 5c

| OPERATING CAPACITIES | MR. HOMEOWNER ANYTOWN, USA THU MAR 04 19:03:18 1993 |
|---|---|

CAPACITY 1 (GRAINS): 18100
CAPACITY 2 (GRAINS): 21208
CAPACITY 3 (GRAINS): 23712
CAPACITY 4 (GRAINS): 25732
CAPACITY 5 (GRAINS): 27684

OPERATING CAPACITY (GRAINS): 18100

PERCENT OF CAPACITY REMAINING: 56

GALLONS REMAINING: 726

Fig. 5d

| USAGE INFORMATION | MR. HOMEOWNER ANYTOWN, USA THU MAR 04 19:03:18 1993 |
|---|---|

DAYS IN OPERATION: 90
TOTAL REGENS: 17
TOTAL GALLONS USED: 15313
TOTAL PREDICTED HARD WATER (GAL): 266
TOTAL FILL TIME (MINUTES): 40
TOTAL SALT USED (LBS): 65
MAXIMUM FLOW RATE (GPM): 15,33
AVG DAYS BETWEEN REGENS: 4,6875
AVERAGE DAILY GALLONS: 179
DAYS SINCE LAST REGEN: 3
SALT EFFICIENCY (GRAINS/LBS OF SALT): 3275

| VALVE STATUS | MR. HOMEOWNER ANYTOWN, USA THU MAR 04 19:03:18 1993 |
|---|---|
| IN REGENERATION: NO<br>VALVE POSITION: SERVICE<br>POSITION TIME: 00:00:00<br>MOTOR/SOL1 STATUS: OFF<br>BYPASS/CHLORINE SOL2 STATUS: OFF<br>HOME SWITCH: CLOSED<br>POSITION SWITCH: OPEN | |

Fig. 5g

| FUNCTIONAL INFORMATION | MR. HOMEOWNER<br>ANYTOWN, USA<br>THU MAR 04 19:03:18 1993 |
|---|---|

ERROR CODE

| ERROR # | 1 | 2 | 3 | 4 | 5 | 6 |
|---|---|---|---|---|---|---|
| HOW MANY | 1 | 0 | 0 | 0 | 0 | 0 |

\# OF RESETS: 6
\# OF LOST TIME RESETS: 2
DAYS SINCE LAST TIMELOSS: 21
LONGEST NO TIMELOSS MIN: 1683
\# OF VALVE REINDEX: 1
\# OF SOFT WATER DEPLETIONS: 3

Fig. 5h

| SOFTENER ANALYSIS | MR. HOMEOWNER<br>ANYTOWN, USA<br>THU MAR 04 19:03:18 1993 |
|---|---|

THERE IS NO ANAYLSIS INFORMATION AVAILABLE AT THIS TIME.

APPARATUS TO PROVIDE A REMOTE DISPLAY OF THE OPERATING CONDITION OF A WATER TREATMENT SYSTEM

This is a continuation of application Ser. No. 08/314,578 filed on Sep. 28, 1994, now abandoned, the text of which is hereby incorporated by reference.

BACKGROUND OF THE INVENTION

1. Field of the Invention

This invention relates to apparatus utilizing a voice-type telephone system for remotely displaying the condition of a water treatment system having an electronic control.

2. Background of the Invention

Water treatment systems, such as water softeners, are provided with electronic controls which are intended to automatically maintain the water treatment system in an operative condition. The distributors of such water treatment system generally also provide maintenance service on the units they have installed. If a water treatment system, such as a water softener installed in a home, is not treating the water properly, the user will call the distributor for service. The distributor would then make a service call to the users home to restore the system to proper operation. However, if the distributor had additional information on the system, such as specific information on the type of system, its currently programmed operating mode, and usage information, it might be possible for the distributor to give the user instructions over the phone which would return the system to proper operation. Even if that were not possible, the additional information could be useful to the distributor in determining what parts are equipment would most likely be necessary for servicing the unit.

Referring particularly to water softening systems, it is necessary to periodically regenerate the resin used for softening the water, when the softening ability of the resin has been expended to a predetermined level. The regeneration of the resin requires a circulation of a regeneration medium through the resin such as a sodium chloride brine solution. The automatic electronic control system will provide the required regeneration when necessary. When using a softener having only one resin bed, the resin regeneration is typically scheduled during the early morning hours when water usage is at a minimum. Further, the regeneration is initiated prior to complete exhaustion of the resin and more particularly based on usage, prior to exhaustion to a level which would possibly result in there not being enough capacity left for softening in the next day's water usage.

If such a water softener should continue to operate without electronic or mechanical malfunctions, all that is necessary to maintain the proper operation of the softener is the addition of salt prior to its exhaustion for providing the brine for regenerating the resin. The distributors of water softeners will frequently provide the service of replenishing the salt used by the water softener on a regular basis. When an average usage of water processed by a softener has been established, it is possible to establish a salt delivery schedule which will ensure that the softener does not run out of salt. However, should there be an unusually large usage of softened water, or should there be a malfunction in the softener control such that it should regenerate more frequently than necessary, it would be necessary to restore the salt supply at an earlier interval than expected. If the salt is not restored when exhausted, a regeneration of the resin bed will be unsuccessful and hard water will be provided to the consumer.

When electronic controls are provided on a softener, information can be stored in electronic form, in electronic memory modules, with respect as to the configuration of the softener and equipment installed, the program settings of the softener and information on the usage of the softener. An arrangement for making this information available to the provider of service to the softener at remote locations, would allow for a diagnosis of softener operation without the servicer having to make an on-site inspection of the softener. This, for instance, would be of particular value wherein the servicer of softeners has a large number of softeners spread over a large geographic area, such as in a lightly populated, rural area. In such cases, it would be desirable for the servicer to periodically obtain information with respect to the softeners which they must service.

SUMMARY OF THE INVENTION

Accordingly, it is an object of this invention to provide an apparatus whereby the operating condition of a water treatment system, such as a water softener having an electronic control, may be displayed at a remote site. It is further desirable that this apparatus be simple to install and use and not significantly increase the cost of the water treatment system. It is a further object of this invention to provide such an apparatus wherein it is not necessary to install equipment permanently attached to the telephone, power or other electrical carrier lines for the transmission of information to the remote site.

In accordance with this invention, an apparatus is provided for transmitting information concerning the operating condition of a water treatment system having electronic control system to a remote display device. The electronic control system is provided with an electronic memory for storing data indicative of the operating condition of the water treatment system. A tone generator is provided for generating tone pulses indicative of the data stored in the electronic memory. With the microphone of a voice telephone system held adjacent to the tone generator, the generator is activated to generate tone pulses indicative of the data stored in the electronic memory. The tone pulses are transmitted over the voice telephone system to a decoding means at the remote location. The decoding means provides a digital signal output indicative of the operating condition of the water treatment system to an electronic means such as a personal computer. The personal computer is provided with a program wherein information concerning the operating condition of the water treatment system may be displayed on a monitor or printed by a printer in a form readily readable by a service person, who is thereby apprised of the operating condition of the water treatment system.

BRIEF DESCRIPTION OF THE DRAWINGS

FIGS. 5a through 5h are displays typical of those provided by the apparatus of this invention.

DETAILED DESCRIPTION OF THE PREFERRED EMBODIMENT

Figure 1:
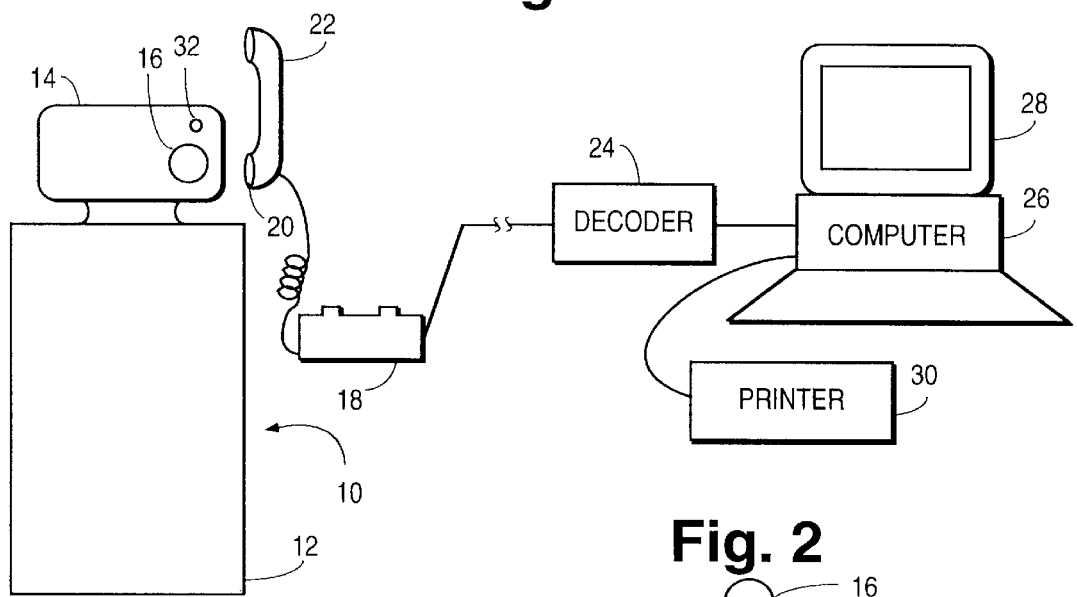
FIG. 1 is a schematic diagram of the apparatus of this invention.
Figure 2:
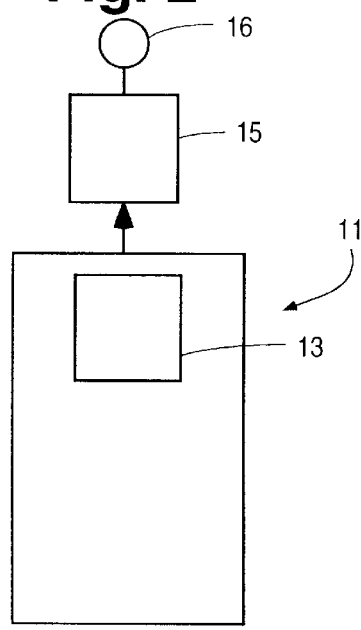
FIG. 2 is a block diagram of the electronic control of this invention.

Referring to FIG. 1 and 2, the major components of the apparatus for providing a remote display of the operating condition of a water treatment system in accordance with this invention are shown. The water treatment system as shown at 10 is a representation of a water softening system having a principal enclosure 12 which contains both the resin tank and a storage area for the salt used to create the sodium chloride brine solution used to recharge the resin. The operation of the water softener 10 is controlled by an electronic control 11 located within a control housing 14. The electronic control 11 includes an electronic memory 13 which stores information concerning the operating conditions of the softener including its configuration, program settings and usage information amongst other data.

A tone generator 15 associated with the electronic controller is designed to generate tone bursts which are indicative of the data stored within the electronic memory. The dashed circle 16 is intended to represent the output of the tone generator 15 which is located behind the face of the controller housing. The tone generator 15 generates tone pulses according to two logic levels. The first logic level being represented by a tone period of substantially 30 msec followed by a non-tone period of substantially 10 msec. The second logic levels is represented by a tone period of substantially 10 msec followed by a non-tone period of substantially 25 msec. A typical voice operated telephone 18 is located such that a speaker 20 of a handset 22 may be placed adjacent to the output 16 of the tone generator. By dialing an appropriate phone number the phone 18 is connected to a decoder 24 located at the remote site at which information concerning the softener is desired. The output of the decoder 24 is provided to an electronic means shown as a personal computer 26 which is programmed to provide visually readable display of the operating condition of the water treatment system, either on the monitor 28 as shown or as printed by a printer 30.

The decoder and personal computer 26 would in a typical application be located at the business site of the distributor providing service to the water treatment device 10. In a normal usage of the apparatus of this invention, the distributor would request the user of the softener to dial an appropriate phone number and then place the microphone 10 adjacent to the tone generator output 16 and actuate a switch 32 to activate the tone generator 15 so as to transmit data to the distributor. The distributor would typically make this request in response to a service call, or to determine if a salt delivery were needed. If the request were made in response to a service call, the distributor might be able to provide instructions to the user which if followed would correct the problem which gave rise to the service call. If correction of the problem could not be made by providing directions to the user, the information would be useful to the distributor in determining what service and service parts would most likely be necessary to correct the problem giving rise to the service call.

Figure 3:
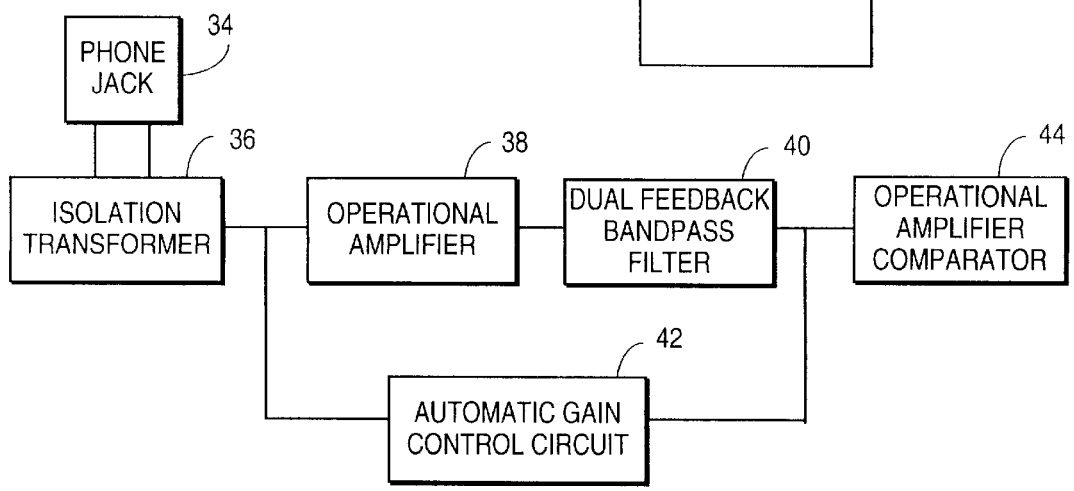
FIG. 3 is a block diagram of the preferred embodiment of the decoding means of this invention.

A more detailed block diagram of a preferred embodiment of the decoder 24 of this invention is shown in FIG. 3. As shown in FIG. 3, the decoder receives its input through a phone jack 34 which is connected through an isolation transformer 36 to the input of an operational amplifier 38. The output of the operational amplifier 38 is in turn provided to a dual feedback bandpass filter 40 which also provides amplification. To assure proper operation and an output at an appropriate signal level, an automatic gain control circuit 42 is connected between the output of the dual feedback bandpass filter 40 and the input to the amplifier 38. The output of the dual feedback bandpass filter 40 is provided to an operational amplifier comparator 44, which in turn provides signals appropriate for application to the electronic means for displaying the operating condition of the system, such as the personal computer 26 shown in FIG. 1.

Figure 4:
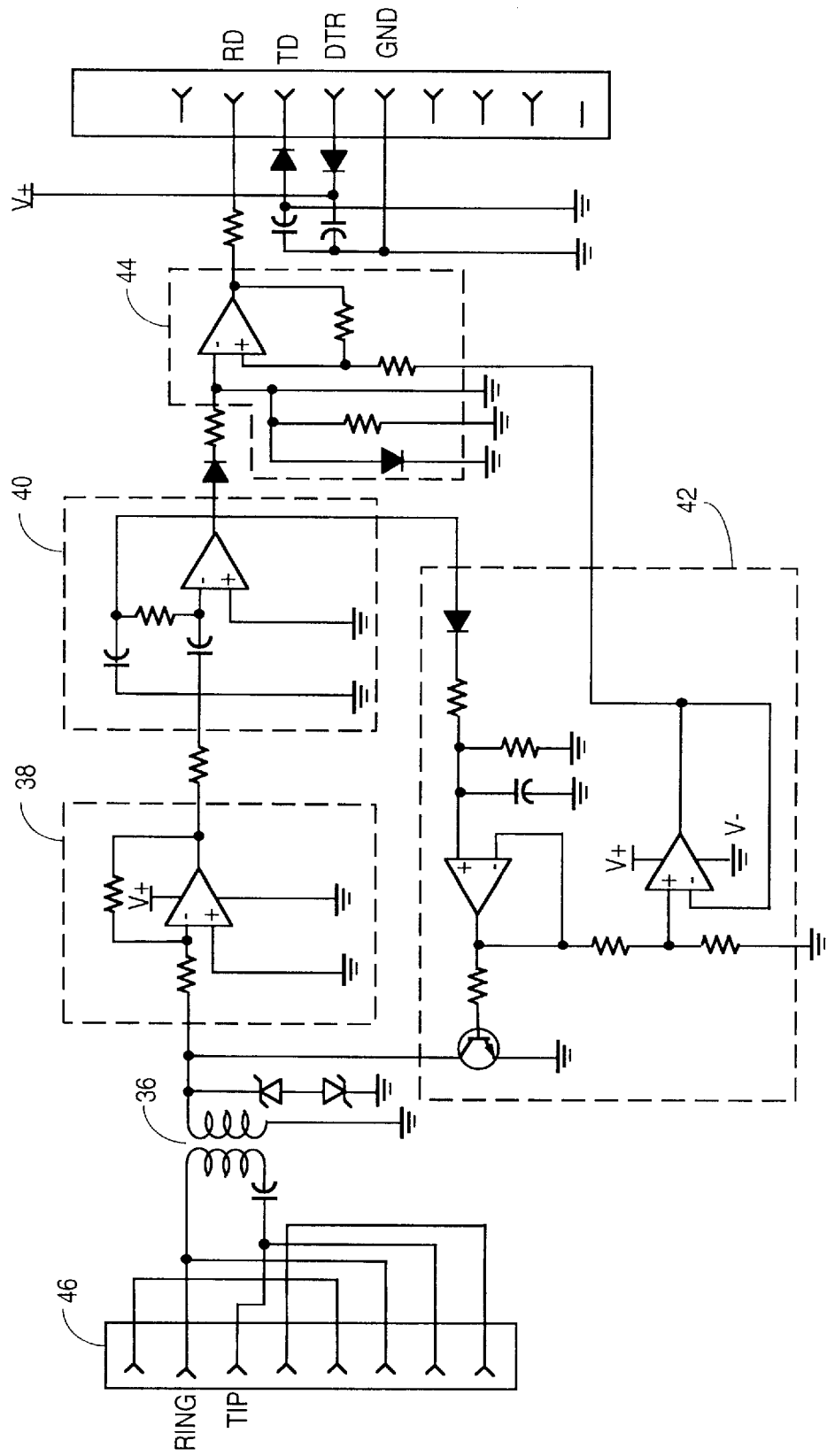
FIG. 4 is a detailed schematic diagram of the preferred decoding means of this invention.

Referring to FIG. 4, a detailed circuit diagram is set forth for the decoding means shown in the block diagram of FIG. 3. A signal from a phone jack 46 is provided to the operational amplifier 38 through an isolation transformer T1. A capacitor C1 prevents DC current from flowing in the transformer primary, thereby preventing an "off-hook" signal from being generated and transmitted to the telephone network. The output of the operational amplifier 38 is coupled to the input of the dual feedback bandpass filter 40 by a resistor R7.

The output of the dual feedback bandpass filter 40 is in turn supplied to the input of the operational amplifier comparator 44 through a diode CR2 and a resistor R12. The output of the dual bandpass filter 40 is also rectified, filtered and fed back to the input by automatic gain control circuit 42 in such a proportion so as to maintain the output signal level relatively constant in amplitude for varying input signal levels. Those skilled in the art will appreciate this technique as a form of automatic gain control (AGC). This technique provides compensation for variances in telephone system signal losses, and tone generator signal strengths.

The operational amplifiers included in the amplifier 38, the dual feedback bandpass filter 40, the operational amplifier comparator 44 and the automatic gain control 42 in a preferred embodiment are provided by a low power quad operational amplifier such as an LM 324.

In a preferred embodiment of this invention, the tone generator provides tone bursts in an asynchronous format consisting of one start bit, 8 data bits, and one stop bit. Persons skilled in the art will recognize this data format as one commonly used to transfer data in serial fashion. Furthermore, it is a data format which, once converted to digital values, is readily accepted by mort personal computer serial input ports. In the preferred embodiment of this invention, the tone burst is at a frequency of 2048 Hertz, and the asynchronous data transmission rate is 50 bits per second. Further, in the preferred embodiment, the gain of the amplifier 38 is 16, and the band width of the bandpass filter 40 is 200 Hertz with a gain of 8.

Figures 5E, 5F:
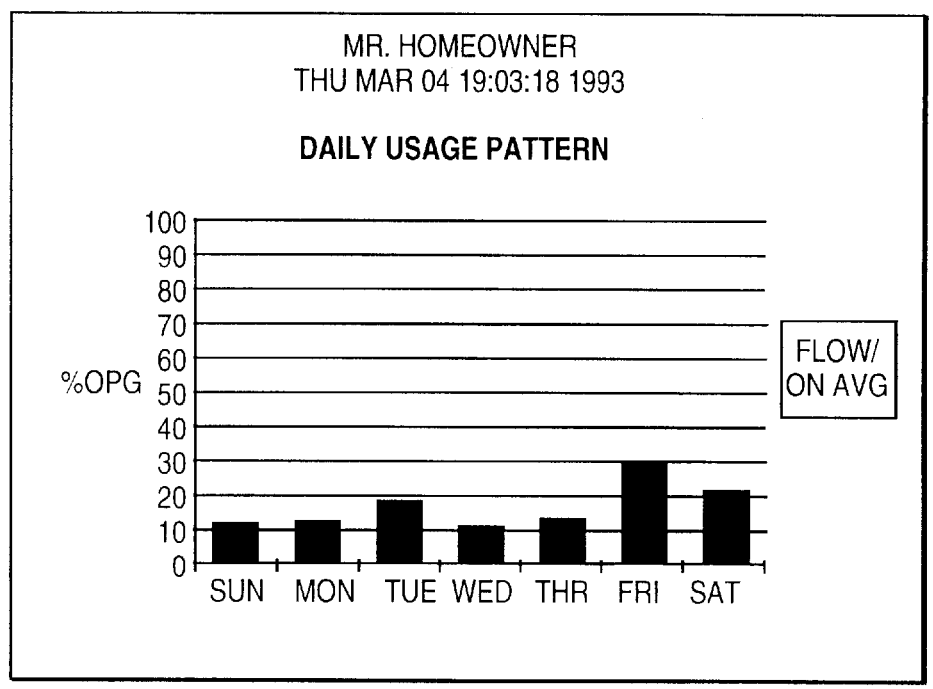

Referring to FIGS. 5a through 5h, typical displays of the operating condition of a softener as would result from the use of the apparatus of this invention is set forth. FIG. 5a, Softener Configuration, provides information on the configuration of the installed softener. FIG. 5b, Displays, provides information on operating parameters including those which were programmed specific to the installation. FIG. 5c, Operating Capacities, provides information on the softening capacity of the system at various capacity settings. FIG. 5d, Usage Information, provides an operating history of the softener. FIG. 5e, Daily Usage Pattern, provides a bar chart setting forth usage by day of the week. FIG. 5f, Valve Status, setting forth current operating parameters of the softener control valve. FIG. 5g, Functional Information, provides information on the operation history of the softener. FIG. 5h, Softener Analysis, provides an analysis of the operation of the softener when appropriate.

It should be apparent to those skilled in the art that what has been described is considered at present to be a preferred embodiment of the apparatus of this invention for providing a remote display of the operating condition of a water treatment system having an electronic control. In accordance with the patent statutes, changes may be made in the apparatus without actually departing from the true spirit and scope of this invention. The appended claims are intended to cover all such changes and modifications which fall in the true spirit and scope of this invention.

We claim:

1. Apparatus for providing a remote display of the operating status of a water treatment system having an electronic control comprising:

an electronic memory associated with the electronic control for storing data indicative of the operating status of the water treatment system, a send only data transmitter including, a tone generator associated with said electronic memory, a manual activator coupled to said tone generator, said manual activator operable by a person to activate said tone generator to generate tone pulses indicative of the data stored in said electronic memory, a telephone system including a microphone positioned by said person to receive said tone pulses, a decoding means at a location remote from said water treatment system, said decoding means receiving said tone pulses transmitted through said telephone system, and providing an output of digital signals indicative of the operating status of said water treatment system, a second electronic control for processing said digital signals so as to provide a readable display of the operating status of said water treatment system at the location remote from said water treatment system.

2. The apparatus of claim 1, wherein said telephone system is of at least voice grade.

3. The apparatus of claim 1, wherein said second electronic means is a microcomputer.

4. The apparatus of claim 1, wherein said second electronic means is a personal computer.

5. The apparatus of claim 4, wherein said personal computer is provided with program for displaying the operating status of said water processing system derived from said digital signals.

6. The apparatus of claim 1, wherein said tone pulses are generated in an asynchronous format.

7. The apparatus of claim 6, wherein said asynchronous format includes 1 start bit, 8 data bits, and 1 stop bit.

8. The apparatus of claim 7, wherein said data bits represent a logic level "1" or a logic level "0".

9. The apparatus of claim 8, wherein one of said logic levels is represented by a tone period of substantially 30 msec followed by a non-tone period of substantially 10 msec, and the other of said logic levels is represented by a tone period of substantially 10 msec followed by a non-tone period of substantially 25 msec.

10. The apparatus of claim 1, wherein said digital signals are represented by two logic levels, one of said logic levels being represented by a tone period of substantially 30 msec followed by a non-tone period of substantially 10 msec, and the other of said logic levels is represented by a tone period of substantially 10 msec followed by a non-tone period of substantially 25 msec.

11. The apparatus of claim 1, wherein said decoding means includes an amplifier, a dual feedback bandpass filter, and an operational amplifier comparator connected in series, with an automatic gain control connected in parallel with said amplifier and dual feedback bandpass filter.

12. The apparatus of claim 1, wherein said decoding means includes an isolation transformer which provides said tone pulses to an operational amplifier connected in series with a dual feedback bandpass filter, an automatic gain control circuit is connected in parallel with said operational amplifier and dual feedback bandpass filter, with the output of said dual feedback bandpass filter being provided as an input to a operational amplifier comparator which provides a digital signal output.

13. The apparatus of claim 1, wherein the water processing system is water softener system.

* * * * *